No. 611,732. Patented Oct. 4, 1898.
H. GRONWALD.
METHOD OF AND APPARATUS FOR MAKING DURABLE FLUIDS CONTAINING CARBONIC ACID.
(Application filed Feb. 21, 1896.)
(No Model.)
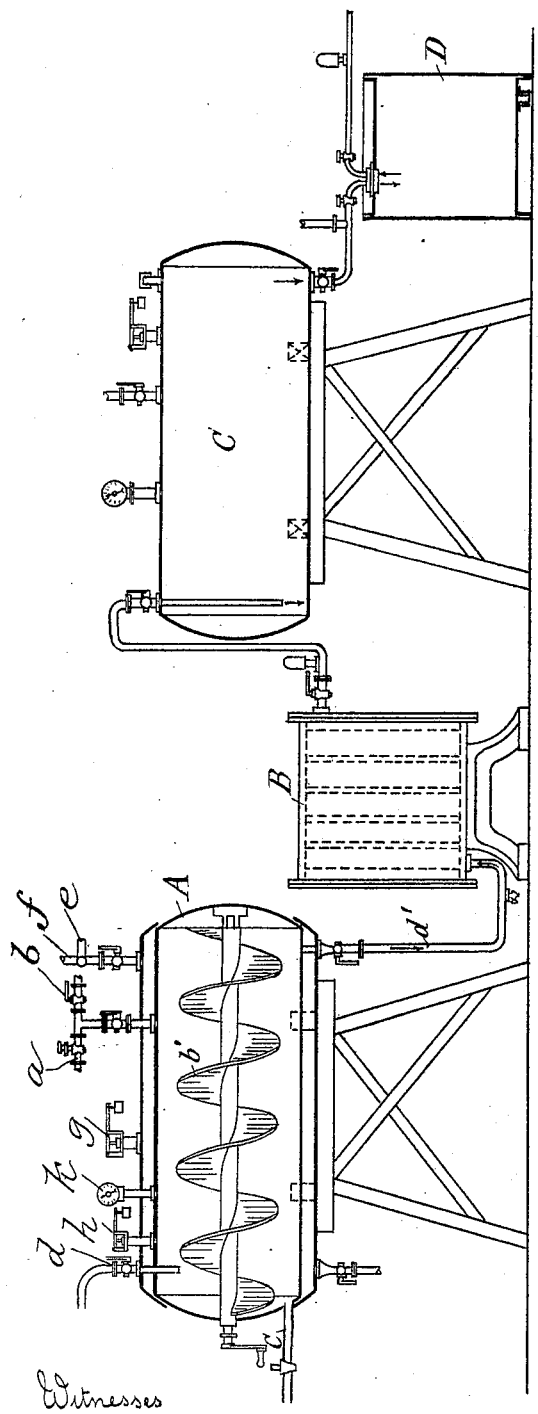

UNITED STATES PATENT OFFICE.

HUGO GRONWALD, OF BERLIN, GERMANY.

METHOD OF AND APPARATUS FOR MAKING DURABLE FLUIDS CONTAINING CARBONIC ACID.

SPECIFICATION forming part of Letters Patent No. 611,732, dated October 4, 1898.

Application filed February 21, 1896. Serial No. 580,278. (No model.)

*To all whom it may concern:*

Be it known that I, HUGO GRONWALD, apothecary, a subject of the King of Prussia, German Emperor, residing at the city of Berlin, Kingdom of Prussia, German Empire, have invented certain new and useful Improvements in Methods of and Apparatus for Making Durable Fluids Containing Carbonic Acids, as Beer and others, of which the following is a specification.

The object of this invention is a process and apparatus for the exact preservation of beer, especially of highly-fermented beer containing much albumen. To obtain this, it is necessary to heat the beer in a vessel that is void of air; but to avoid a vacuum, which by its physical nature might result in a reinfection of the vessel, it has to be filled with a sterile gas—as, for instance, carbonic acid—and to finish the treatment of the beer in the same vessel, prepared in the way described.

The term "exact preservation" does not only mean the preservation of the beer as a marketable beverage, but the preservation of the same in its original chemical composition, especially the preservation of the proteins in their original state and the prevention of their being eliminated during the heating and afterward the storing of the beer. It conveys, furthermore, the meaning that the original taste of the beer shall be preserved and the taking of the bread taste, (taste of pasteurization,) which, with the methods now in use, the beer always takes, prevented. The process necessary for this effect is the following:

The heating vessels A and the other vessels connected with the same by means of pipes provided with valves—as, for instance, the filter B and reservoir C—have to be freed from air by the injection of steam, whereby the steam sterilizes the apparatus. As soon as the vessel is void of air the pipe $a$, conducting the steam, is locked, and in order to prevent a vacuum by which air might be pumped into the apparatus the steam is replaced by carbonic acid, which is conducted to the heating vessel by the pipe $b$, and, as the same is in connection with the filter B and the reservoir C, is also communicated to the latter two. Hereafter the beer is pressed by means of steam or carbonic acid into the heating vessel A, which has been locked before against the vessels B and C. When the heating vessel is filled, the pipe $c$, by which the beer comes in, is locked. If beer—as, for instance, the highly-fermented one—contains air, the latter has to be ejected while the beer is in the heating vessel. This is best done in this way, that the carbonic acid which is already in the heating vessel is pressed into the beer by means of a mixing and shaking apparatus impelled by a crank. The carbonic acid not absorbed by the beer in leaving the latter takes away with it the air which was contained in the same, whereafter this air, combined with the surplus of the carbonic acid, forms a layer above the beer, standing with the latter under the same pressure, and flows out by the opening of a valve $d$. When all this is done, the beer is heated by introducing steam through the pipe $e$ into the space between the heating vessel and the mantle which surrounds the latter. According to the kind of beer, temperatures of from 55° to 100° Celsius may be employed without injurious effect to the beer. To effect the heating and cooling of the beer in a uniform way, it is well to keep the shaking apparatus in a slow but constant movement. After the beer has been sufficiently heated the cooling process begins by introducing ice-water by pipe $f$ into the space between the vessel and its mantle, and then the beer is restored inside the heating vessel to its original state by shaking the same with the shaking apparatus, whereby the alcohol which was transformed into gas during the heating and has been recondensed again by the cooling, as well as the carbonic acid and the aromatic substances, are restored to the beer. Should there be a lack of carbonic acid in the beer, the same may be added while the beer is still in the heating vessel and compounded with the beer by shaking the whole with the shaking apparatus. Having treated the beer as described, the valve of the pipe leading from the heating vessel to the filter is opened and the beer pressed into the latter by overpressure of carbonic acid, and from there it is led to the reservoir, passing from one vessel to the other without any contact with the air. From the reservoir it is to be led by an isobarometrical apparatus to the casks or kegs or bottles in which it is to be marketed.

In the accompanying drawing the figure is a vertical section of the whole apparatus to be used for the described process, whereby all the component parts of the same are shown as being in one line.

The heating vessel A consists of a cylinder with a mantle $a'$, and is provided, as usual, with the necessary pipes for the inflow and outflow of the beer, carbonic acid, steam, and cooling material, as well as with a thermometer and other arrangements. Inside it has a shaking device $b'$, which can be actuated from outside by means of a crank.

A pipe $d'$ has the purpose of conducting the steam and then the carbonic acid destined to replace the steam into the beer, and afterward, when the beer has undergone the process described of conducting the beer into the filter and the reservoir, suitable safety-valves are used at $g$ $h$ and a gage at $k$.

B and C are the filter and reservoir, of well-known construction, with the difference that the latter has an isobarometrical arrangement for conducting the beer into the casks or kegs for the marketing or storing of the same, by which arrangement the contact of the air with the beer is avoided.

D is a transporting vessel which receives the beer from the reservoir C.

I claim—

1. A process for preserving beer, characterized by the features that the beer is treated in a heating vessel A which is void of air and in order to avoid a vacuum filled with carbonic acid, in which heating vessel the beer itself is freed from air, then heated and cooled, and afterward shaken for the purpose of restoring it to its original quality by recompounding with the beer, the alcohol, carbonic acid and aromatic substances which had been evaporated by the heating and then recondensed by the cooling of the beer, this shaking being done inside of the heating vessel by means of a shaking apparatus inside, which is actuated from outside of the vessel.

2. The herein-described process for preserving beer consisting in first sterilizing the vessel and simultaneously driving out the air, introducing carbonic acid to prevent the formation of a vacuum, then forcing the beer into the vessel, stirring the beer to cause the same to mix with the carbonic acid whereby the beer will absorb a part of the carbonic acid while the residue of the carbonic acid in leaving the beer will take away any air which may have been contained in the same, then discharging the surplus carbonic acid with the air and then heating and cooling the beer and afterward shaking and stirring the beer for the purpose of restoring it to its original quality by recompounding with the beer the alcohol, carbonic acid and aromatic substances which had been evaporated by the heating and then recondensed by the cooling of the beer, this shaking being done inside the heating vessel.

In witness whereof I have hereunto set my hand in presence of two witnesses.

HUGO GRONWALD.

Witnesses:
  W. HAUPT,
  CHARLES H. DAY.